United States Patent [19]

Fowler

[11] Patent Number: 4,484,904
[45] Date of Patent: Nov. 27, 1984

[54] MANUFACTURING PLASTIC BAGS

[75] Inventor: Arthur J. Fowler, Reading, England

[73] Assignee: Radyne Limited, Warkingham, England

[21] Appl. No.: 454,682

[22] Filed: Dec. 30, 1982

[30] Foreign Application Priority Data

Jan. 4, 1982 [DE] Fed. Rep. of Germany ....... 8200066

[51] Int. Cl.³ ............................................. B65D 33/16
[52] U.S. Cl. .................................. 493/213; 156/292; 156/293; 383/35; 383/94; 604/408
[58] Field of Search .................... 156/290, 292, 308 X, 156/226, 227, 250, 263, 268, 294, 293; 493/213, 212; 383/35, 94; 604/408–410

[56] References Cited

U.S. PATENT DOCUMENTS 3,473,532 10/1969 Eisenberg ........................ 383/35 X
4,131,200 12/1978 Rinfret .............................. 383/94 X
4,364,478 12/1982 Tuns ................................ 493/212 X
4,365,629 12/1982 Pert et al. .......................... 604/408

Primary Examiner—David Simmons
Attorney, Agent, or Firm—Kemon & Estabrook

[57] ABSTRACT

In making a plastic bag having a filling pipe, to overcome the difficulty of separating the overlying walls of a flattened tube of plastics material, one wall (11b) of the flattened tube (10) is cut to form a flap (17) and the opposite wall (11a) of the flattened tube is cut to form an opening (14), registering with at least a part of the flap; two pairs of clamping members (22, FIG. 4) engage the flap at the location of the opening and are moved to cause the flap (17) to extend out of the plane of the first wall of the tubing; and the filling pipe (26) is then inserted between the pairs of clamping members (22) and on the inner side of the displaced flap to enter the space between the overlying walls of the tube. Thereafter the walls of the flattened tube are sealed around the filling pipe.

9 Claims, 12 Drawing Figures

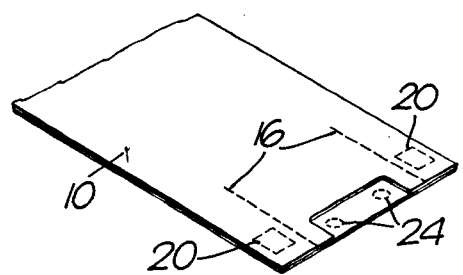
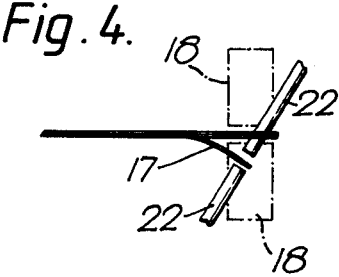
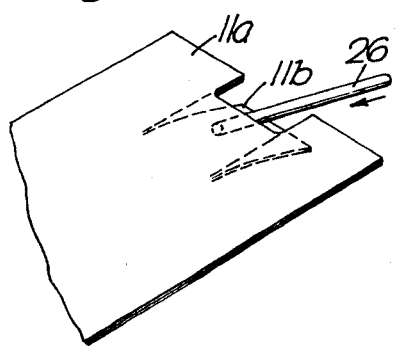
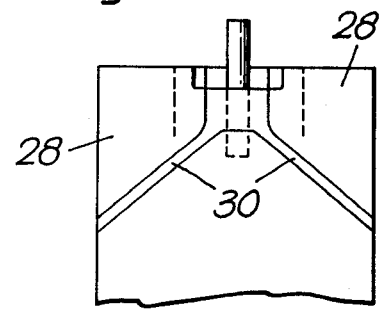
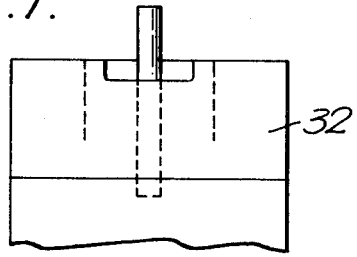
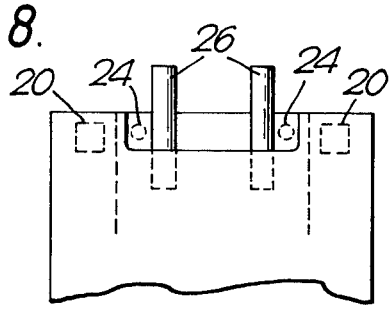
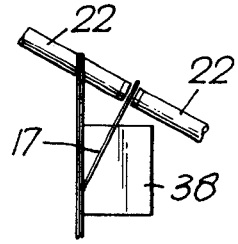
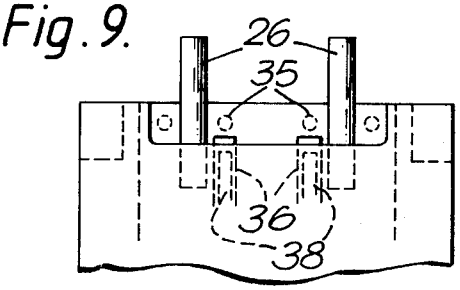

MANUFACTURING PLASTIC BAGS

In the manufacture of plastic bags, each fitted with a plastic pipe (such as are used in medical practice as infusion and intravenous bags or for blood samples, colostomy, etc.), it is customary to start with a roll of plastic strip consisting of a flattened tube of plastics material and to separate the two overlying walls of the flattened tube at the tube end to permit the insertion of the plastic pipe; thereafter, the end of the flattened tube is sealed around the inserted plastics pipe and a sufficient length of the flattened tube is cut off to form the bag, the cut end being also sealed to close the bag. In such a process, the separation of the overlying sheets of the flattened tube is very difficult. It is normally effected with a blunt knife edge but failure to separate the sheets is still very frequent.

The object of the present invention is to make the separation of the sheets and the insertion of the pipe easier and more reliable.

A method according to one aspect of the present invention, for making a plastics bag having a filling pipe, comprises: cutting one wall of a flattened tube of plastics material to form a flap; cutting the opposite wall of the flattened tube to form an opening, registering with at least a part of the flap, and inserting a pusher member through the opening to cause the flap to extend out of the plane of the first wall of the tubing, and thereafter inserting the filling pipe alongside the portion of the pusher projecting through the first wall and on the inner side of the flap to enter the space between the overlying walls of the tube, after which the flattened tube is sealed around the filling pipe.

In the preferred method, this operation is carried out on bag blanks separated from the roll of plastics strip, the separation being carried out in such a manner that the opening in the above-mentioned opposite wall is a recess extending from one end edge of the separated blank, and the opening end of the flap is at the end of the tube.

In the preferred form of the invention, there are two pusher members and each of these forms one of a pair of clamping members, the clamping members being moved together to draw the flap away from the other wall of the blank. The filling pipe is inserted between the two pairs of clamping members.

If desired, the insertion of the filling pipe could take place while the blanks were still part of the strip of plastics tubing; a method according to this aspect of the invention, comprises cutting one wall of a flattened tube of plastics material to form a flap; cutting the opposite wall of the flattened tube to form a second flap registering with at least a part of the first flap; and urging a pusher member against the second flap to cause both flaps to extend out of the plane of the first wall of the tubing, and thereafter inserting the filling pipe alongside the portion of the pusher member projecting through the first wall and under the second flap to enter the space between the overlying walls of the flattened tube, after which the flattened tube is sealed around the filling pipe. In the preferred form of this aspect of the invention, the second flap cut in the second of the overlying walls hinges in a sense opposite to the direction in which the first flap hinges in the first wall. Again, a pair of pusher members or a pair of clamps are used in the preferred forms. Also, in this embodiment registering slots are cut in the top and bottom walls where the neck of the bag is to be located to enable the strip to be cut at the neck portion when the pipe has been inserted without the risk of cutting across the inserted pipe.

In order that the invention may be better understood, two examples of methods and apparatus embodying the invention will now be described with reference to the accompanying drawings, in which:

FIG. 1 shown an example of the kind of bag to which the invention relates;

FIG. 3 shows the clamping areas for the cut plastics tubing;

FIG. 4 shows the manner in which a flap formed in the plastics tubing is moved to enable a filling pipe to be inserted;

FIG. 5 illustrates the insertion of the filling pipe;

FIGS. 6 and 7 illustrate two methods of sealing the bag around the filling pipe;

FIGS. 8, 9 and 10, show a method of inserting two pipes into a single bag formed from the plastics tubing;

Figure 1:
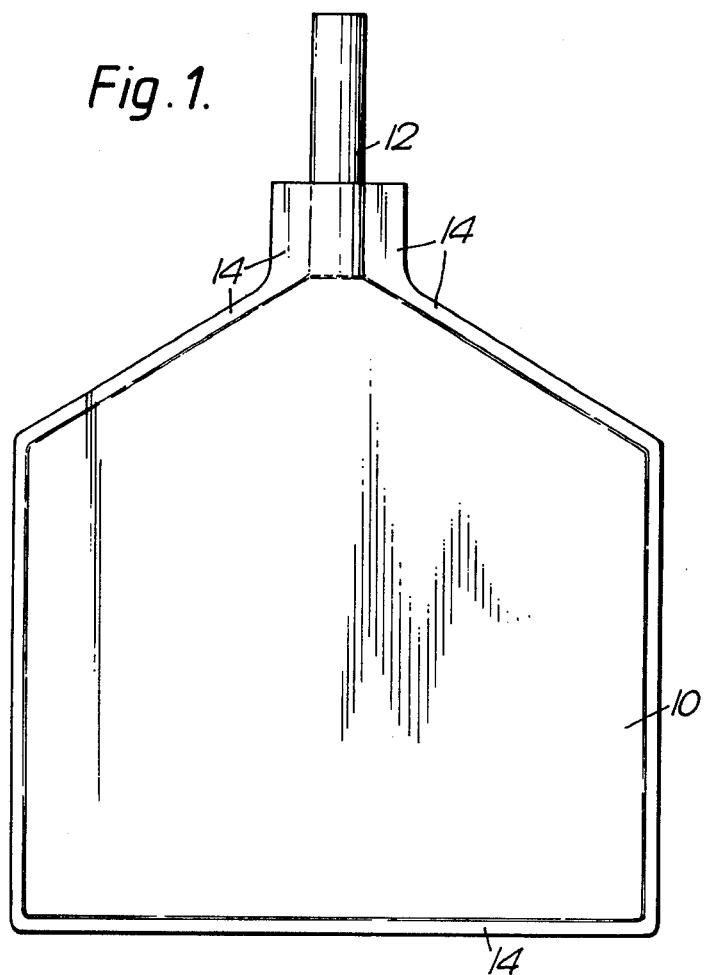

The bag shown in FIG. 1 is made from a strip of flattened plastics tubing 10 in one open end of which a plastics pipe 12 has been inserted. The two walls of the flattened plastics tubing has been sealed in the areas 14 at the top and bottom of the bag and the bag has been cut from the strip.

As previously explained, the insertion of the plastics pipe 12 between the closely overlying walls of the plastics tubing strip 10 presents considerable difficulties.

Figure 2:
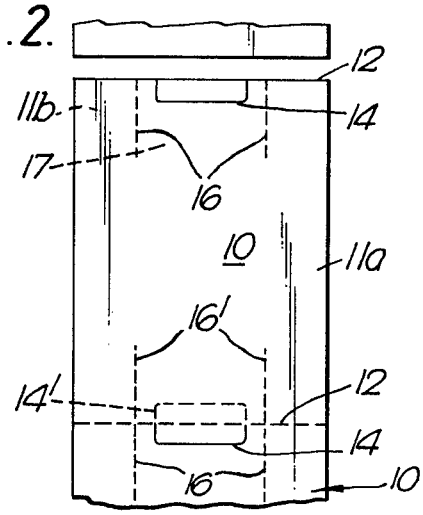
FIG. 2 shows a strip of plastics tubing and indicates where cuts have been made and will be made.

Referring now to FIG. 2, a flattened strip of plastics tubing 10 is cut through both walls from side to side along the line 12 at the boundary of two bags. The top web 11a of the blank is also cut along a line 14 to form a recess in the top web extending from the leading edge of the bag blank. Cuts 16 are also formed in the lower web 11b and these cuts, with the edge formed by the severing of the preceding bag, define a flap 17 in the lower web.

In FIG. 2, the cuts made at 12, 14 and 16 in the lowest bag 10 are made while a tube is being welded in the mouth of the bag shown in full. Extra cuts 14' and 16' are made at the bottom of this bag if a further pipe is to be inserted into its lower end.

To enable a plastic pipe to be inserted into the tube, two clamps 18 grip the tube at areas 20 outside the two lines 16 (see FIG. 3) and two further clamps 22 grip the lower web 11b of the tube (and the detached portion of the upper web 11a which normally adheres to the lower web) at the points 24. With the clamps 18 stationary, the clamps 22 are moved to the position shown in FIG. 4, thereby pulling down the flap 17 to open the mouth of the tube.

A short length of plastics pipe 26 is now inserted between the clamps 18, over the flap 17 between the two walls 11a and 11b of the tubing; the insertion of the tube is shown in FIG. 5, in which the clamps have been omitted for clarity.

Thereafter, the plastics tubing is sealed around the inserted pipe and transversely across the plastics tubing, on both sides of the pipe. Additionally, the other end of the bag blank is sealed across.

As mentioned above, if it is desired to insert a further pipe through the other end of the bag blank, additional cuts 14 and 16 are made at the other end, so that a new flap and a new recess in the webs 11b and 11a respectively extend inwardly from the trailing end of the bag; further clamps separate the new flap from the opposite wall of the tubing to enable the second pipe to be inserted.

FIGS. 6 and 7 show the manner in which the bag is sealed around the inserted filling pipe. In FIG. 6, the scrap material 28 above the welding line 30 is removed; this scrap material includes the cuts 16. In FIG. 7, the whole of the upper area 32 is welded.

In some cases, it is desirable to insert more than one tube into one end of the bag. This necessitates making the flap 17 and the recess 14 wider to accommodate the two pipes 26 (FIG. 8). However, when this is done, and with the clamping areas 20 and 24 at the positions shown, the bag sometimes fails to open at its mid-point. To overcome this problem, additional opening clamps are used at positions 35 and additional cuts 36 are made in the lower web 11b of the tube (FIG. 9). These additional cuts form elongate flaps in the web which permit the use of reaction members 38 underneath the assembly. FIG. 10 is a view on section A—A of FIG. 9, showing the reaction members, the opening clamps, and the plastics bag with its flap 17.

In another method embodying the invention, the plastics pipe is inserted in each bag blank while the bag forms part of a strip. This method will now be described with reference to FIGS. 11 and 12 of the accompanying drawings.

Figure 11:
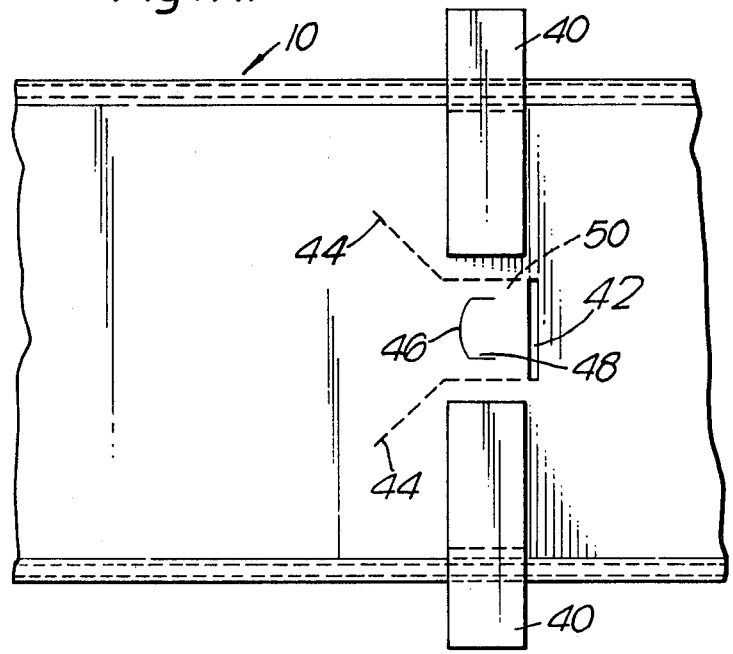
FIG. 11 shows the location of the cuts in a plastics tubing strip in a further method embodying the invention.
Figure 12:
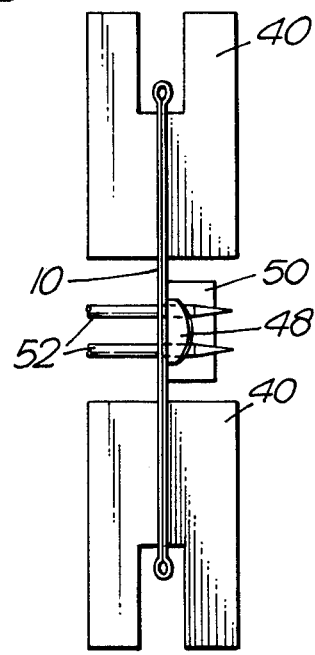
FIG. 12 is an end view of the assembly shown in FIG. 11.

Referring now to FIGS. 11 and 12, a portion of the strip 10 of plastics tubing is shown with the lateral parts of the transverse portion which is to form the neck of the bottle held between clamps 40. The strip of tubing 10 is fed automatically from reels. At the point which is to form the upper end of the bottle, where the pipe emerges, a slot 42 is punched through both walls of the tubing. In the underlying wall of the tubing, two cuts 44 are made, these cuts having portions which are parallel to the lateral edges of the tubing and which at one end extend into the slot punched in the lower web 11b and at their other ends lead into diverging portions of the cuts. Another cut 46 is made through the upper wall of the tubing; this cut does not extend up to the slot and the flap 48 which it forms is located between the parallel portions of the cuts in the lower wall.

The effect of these cuts is to form in the lower wall a flap 50 having a movable end at the location of the slot and hingeing about its opposite end, and to form in the upper wall the smaller flap 48 whose hinge portion is parallel to that of the larger flap; however, the free ends of the flaps are oppositely directed in relation to their hinge portions.

Next, two probes 52 are inserted through the tubing where the flaps overlie one another, the direction of insertion of the probes being such that the smaller flap in the upper wall is pushed through the lower wall and the larger flap is pushed downwards out of the plane of the lower wall, the terms upper and lower referring to the tubing as shown in FIG. 11.

Referring now to FIG. 12 the two flaps 48 and 50 are shown extending on the same side of the tubing with the spaced parallel probes 52 passing between them. A short length of plastics pipe 26 is now inserted between the probes, over the flap 48 and under the flap 50, between the two walls of the tubing.

Thereafter, the plastics tubing is sealed around the inserted pipe and transversely across the plastics tubing (as shown at 14 in FIG. 1) and the bag is cut from the strip.

It will be seen that this provides an easy and reliable way of separating the overlying sheets of the flattened tubing strip.

The sealing of the opposed walls of the tubing strip can be effected by means of dielectric heating or conventional heat sealing, for example.

If desired, when the flattened tube blanks are cut from a strip of flattened tube, the portion of the flattened tube which is cut away by the cuts 12 and 14 in the method illustrated in FIG. 2 can be left attached to the preceding blank (by restricting the effect of the cut 12 on one web of the tube blank), to form a tag on the end of the preceding bag blank. This tag can be used for hanging the bag.

I claim:

1. A method of making a plastics bag having a filling pipe, comprising the steps of:
    cutting one wall of a flattened tube of plastics material to form a flap;
    cutting the opposite wall of the flattened tube to form an opening, registering with at least a part of the flap;
    inserting a pusher member through the opening to cause the flap to extend out of the plane of the first wall of the tubing;
    inserting the filling pipe alongside the portion of the pusher member projecting through the first wall and on the inner side of the flap to enter the space between the overlying walls of the tube;
    and thereafter sealing the flattened tube around the filling pipe.

2. A method according to claim 1, in which the opening end of the flap is constituted by a part of the open end of the flattened tube of plastics material and the opening in the said opposite wall is a recess extending from the same end of the flattened tube.

3. A method in accordance with claim 1, in which two spaced pusher members are inserted through the opening to cause the flap to extend out of the plane of the first wall of the tubing, and in which the filling pipe is inserted between the two pusher members.

4. A method in accordance with claim 3, in which each of the pusher members forms one of a pair of clamping members, the clamping members being moved together to draw the flap out of the plane of the first wall of the tubing.

5. A method in accordance with claim 3, further comprising holding the lateral portions of the flattened tube in a fixed position while the pusher members or clamping members operate to cause the flap to extend out of the plane of the first wall of the tubing.

6. A method of making a plastics bag having a filling pipe, comprising the steps of:
    cutting one wall of a flattened tube of plastics material to form a flap;
    cutting the opposite wall of the flattened tube to form a second flap registering with at least a part of the first flap;
    urging a pusher member against the second flap to cause both flaps to extend out of the plane of the first wall of the flattened tube, on the same side of the tube;
    inserting the filling pipe alongside the portion of the pusher member projecting through the first wall and under the second flap to enter the space between the overlying walls of the flattened tube;

and thereafter sealing the flattened tube around the filling pipe.

7. A method in accordance with claim 6, in which the insertion of the filling pipe takes place while the flattened tube is still attached to a strip of plastics tubing sufficient to form a number of plastics bags.

8. A method according to claim 6, in which the second flap cut in the second of the overlying walls hinges in a sense opposite to the direction in which the first flap hinges in the first wall.

9. A method in accordance with claim 6, comprising cutting registering slots in the top and bottom walls where the neck of the bag is to be located to enable the tubing to be cut at the neck portion when the filling pipe has been inserted without the risk of cutting across the inserted pipe.

* * * * *